United States Patent
Dietz

(10) Patent No.: US 6,488,260 B1
(45) Date of Patent: Dec. 3, 2002

(54) ELECTRIC FAIL SAFE VALVE ACTUATOR

(75) Inventor: Wesley P. Dietz, Carrollton, TX (US)

(73) Assignee: Halliburton Energy Services, Inc., Dallas, TX (US)

( * ) Notice: Subject to any disclaimer, the term of this patent is extended or adjusted under 35 U.S.C. 154(b) by 0 days.

(21) Appl. No.: 09/685,752

(22) Filed: Oct. 10, 2000

(51) Int. Cl.[7] .............................................. F16K 31/02
(52) U.S. Cl. ........................... 251/129.13; 251/129.15; 464/30
(58) Field of Search ............................... 251/81, 129.11, 251/129.13, 129.15, 71, 69, 70, 266, 262; 464/37, 30

(56) References Cited

U.S. PATENT DOCUMENTS

| | | | |
|---|---|---|---|
| 2,930,571 A | * 3/1960 | Vogl | 251/129.12 |
| 4,417,650 A | * 11/1983 | Geisthoff | 192/56.1 |
| 4,691,893 A | 9/1987 | Akkerman et al. | |
| 5,195,721 A | 3/1993 | Akkerman | |
| 5,832,779 A | * 11/1998 | Madrid et al. | 137/72 |
| 5,916,325 A | * 6/1999 | Madrid et al. | 192/56.1 |
| 5,984,260 A | * 11/1999 | Rawson et al. | 251/129.12 |

OTHER PUBLICATIONS

Halliburton Brochure, "Leo[TM]"(Linear Electric Operator) Actuator, *The King of Fail–Safe Valve Actuation*, Halliburton Energy Sevices, Inc., 1999.

Dresser Oil Tools Brochure Leo (Linear Safety Release Electric Operator) *Electrically Powered Actuator for Reverse Acting (Fail–Closed) and Direct Acting (Fail–Open) Gate Valves*, Dresser Oil Tools, 1998.

EFS Range Brochure, *Electric Fail–Safe Valve Actuators for Oil and Gas Production Facilities* Rotork Actuation.

* cited by examiner

*Primary Examiner*—Philippe Derakshani
*Assistant Examiner*—D. Austin Bonderer
(74) *Attorney, Agent, or Firm*—William M. Imwalle; Peter V. Shroeder

(57) ABSTRACT

A fail safe valve actuator is disclosed that is powered by an electric motor which drives through a wrap spring clutch and a centrifugal brake configured to absorb a portion of the energy released when the power fails and the valve stem is moved rapidly to its fail safe position by an actuator spring. The valve member is held in operating position by a solenoid. When power fails, a spring moves the valve stem in the other direction to move the valve member to its fail safe position. A torque limiting device is mounted adjacent the output end of a gear train to protect the gear train and the electric motor from the high torque created when the valve stem abruptly stops moving when the valve member reaches its operating position.

8 Claims, 4 Drawing Sheets

ELECTRIC FAIL SAFE VALVE ACTUATOR

TECHNICAL FIELD

A fail safe electric valve actuator mounted to transfer power to a valve stem.

BACKGROUND OF THE INVENTION

Fail safe valve actuators heretofore devised have generally included a torque limiting device connected directly to the drive shaft of an electric motor for protecting the electric motor from the high torque created when the valve stem abruptly stops moving when the valve member reaches its operating position. These devices generally include a centrifugal brake between the torque limited device and the valve stem to absorb a portion of the energy released when the power fails and the valve stem is moved rapidly to its fail safe position by a spring. The relative positions of the torque limiting device and the centrifugal brake under certain operating conditions did not provide consistent closing speed and did not adequately protect drive systems.

A fail safe valve actuator powered by an electric motor is disclosed in U.S. Pat. No. 5,195,721 entitled "FAIL SAFE VALVE ACTUATOR." The output shaft of the motor is connected to a centrifugal clutch and a torque-limiting device, both located in a centrifugal clutch housing. The output shaft of the torque-limiting device is connected to a pinion in the gear housing portion of the actuator housing.

When centrifugal force is sufficient to provide enough friction to transmit torque without undue slippage between shoes and the clutch housing, the housing rotates with the output shaft of the motor. The torque limiting device is in the upper portion of the centrifugal clutch housing. When the centrifugal clutch is engaged and the motor is running, the clutch housing rotates with a disc as long as detent buttons are in engagement with indentations. As the torque increases, the lateral force between the detent buttons and sloping walls of the indentations increases. When the valve stem stops moving, the detents will be forced laterally out of the indentations to disconnect the electric motor from the output shaft of the clutch.

In a second embodiment of the apparatus discloses in U.S. Pat. No. 5,195,721 a wrap spring clutch is mounted on the ball screw mechanism on the valve stem for holding the valve stem in position and to resist rotation of the valve stem by force applied by the spring in the valve actuator. A centrifugal brake is provided in this embodiment to dissipate the energy and thus slow down the upward movement of the valve stem. The centrifugal brake is in slow speed high torque position, while the wrap spring clutch is mounted in a high torque position.

The output shaft of the torque-limiting device, connected to the input pinion in the gear housing portion of the actuator housing, is in a position where power is transmitted at high speed and relatively low torque, making it difficult to adjust the clutch to provide precision speed control. The relative positions of the torque limiting device and the centrifugal brake under certain operating conditions resulted in excessive wear and maintenance of the clutch and drive system.

SUMMARY OF THE INVENTION

The electric fail safe valve actuator disclosed herein relates to improvements in the valve actuator disclosed in U.S. Pat. No. 5,195,721, the disclosure of which is incorporated herein by reference in its entirety for all purposes. Specifically, reference is made to this patent for a description of the details of the construction of the valve actuator connected between the gear train and the valve which is being actuated.

An electrically actuated clutch is located between an electric motor and a gear train such that the torque required from the electrically actuated clutch is reduced. This increases the clutch life and reduces power consumption. The clutch is capable of holding the valve in its operating position during extreme vibration and has a very consistent closing speed. Further, the clutch is configured to hold the valve member in its operating position when the motor is not energized.

A torque-limiting device is connected to the output end of a gear train in a position where power is transmitted at lower speed and at higher torque than in devices heretofore devised. The relative positions of the torque limiting device and the electrically operated clutch enhance the ability to provide consistent closing speed and reduce power consumption. The torque limiting device positioned at or near the output end of the gear train provides added protection for parts of the valve actuator. Further, operating at high torque causes the slip clutch to be less sensitive than torque limiting devices positioned between the electric motor and the input shaft of the gear train which operated at high speed and low torque.

Disclosed herein is an improved method of actuating a valve wherein power is transmitted from a motor through an electrically actuated clutch mechanism that includes an electrically actuated wrap spring clutch and a centrifugal brake to the input end of a drive train, wherein the electrically actuated clutch mechanism is preset to engage for transmitting power to the drive train. The centrifugal brake is actuated only after reaching a predetermined speed to provide smooth engagement for protecting the drive train against shock and high stresses and dissipates energy.

Power is transmitted adjacent the output end of the gear train through a torque limiter, such as a friction overload slip clutch to a ball nut, wherein the torque limiter is preset to limit torque transmitted from the gear train to the ball nut and from the ball nut to the output end of the gear train to prevent damage due to excessive torque generated by overloads.

DESCRIPTION OF THE DRAWINGS

Drawings of a preferred embodiment of the invention are annexed hereto, so that the invention may be better and more fully understood, in which.

Numeral references are employed to designate like parts through out the various figures of the drawing.

DESCRIPTION OF A PREFERRED EMBODIMENT

Figure 1:
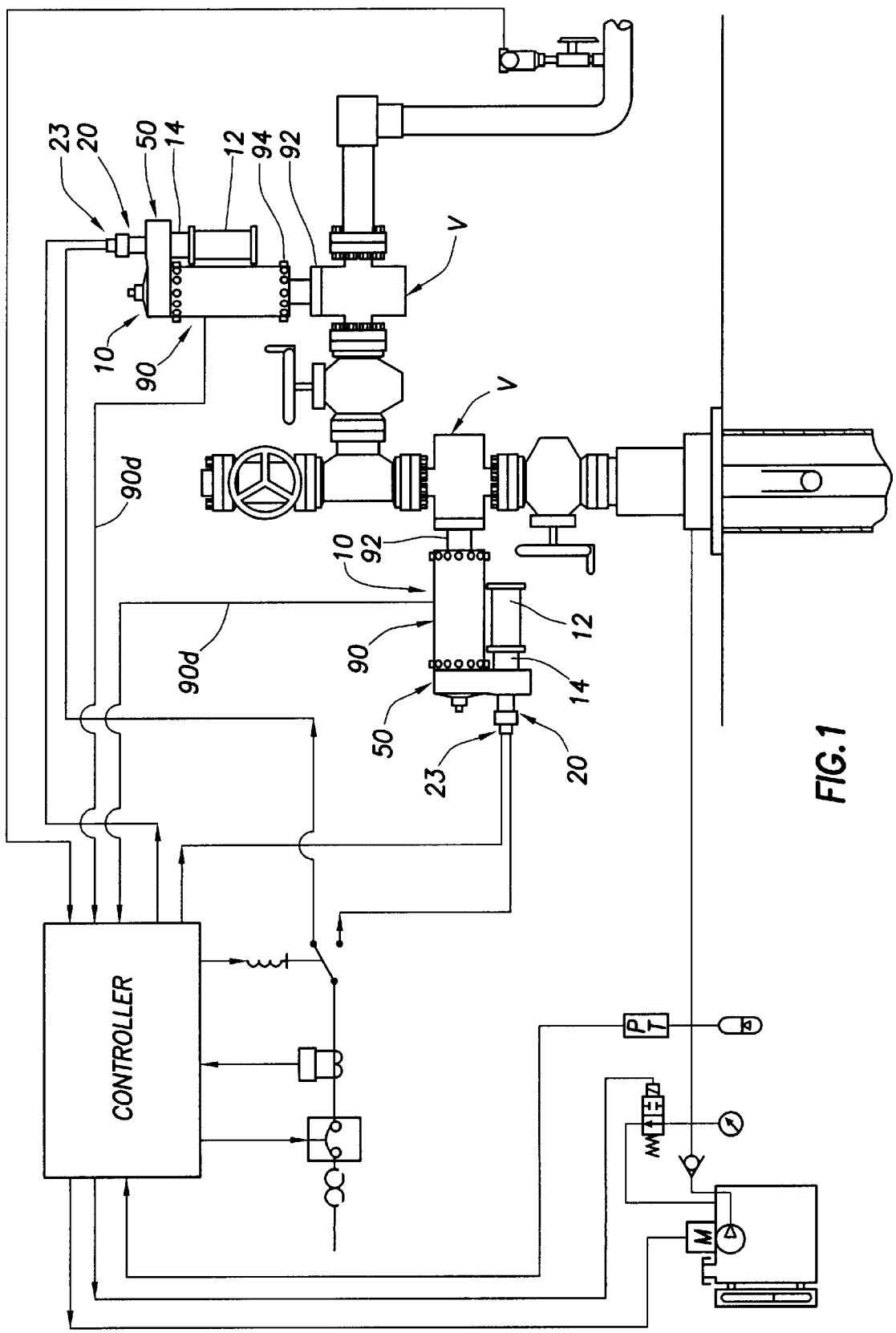
FIG. 1 is a diagrammatic view of a typical installation.

Referring to FIG. 1 of the drawing, a valve actuator is generally designated by the numeral 10 for actuating a valve "V." The valve actuator 10 generally comprises a motor 12, control module 20, gear box housing 50, and actuator 90. Valve "V" may be a surface safety valve (SSV), a shutdown valve (SDV) or a blow down valve (B.V.). FIG. 1 is a diagrammatic view of a typical well head installation.

A preferred embodiment of the actuator 10 is illustrated mounted on a stuffing box housing 92, which is bolted to a valve body "V." A suitable connector 94 attaches actuator housing 96 to stuffing box housing 92. Valve stem 98, best illustrated in FIG. 3, extends through the stuffing box housing 92 and has its lower portion connected to a valve member (not shown) for moving the valve member between open and closed positions as the valve stem 98 is reciprocated. The upper portion of the valve stem 98 is connected by a coupling 99 to a ball screw 85 with a helical groove to receive the balls in a ball nut 84, as will be hereinafter more fully explained.

Figure 2:
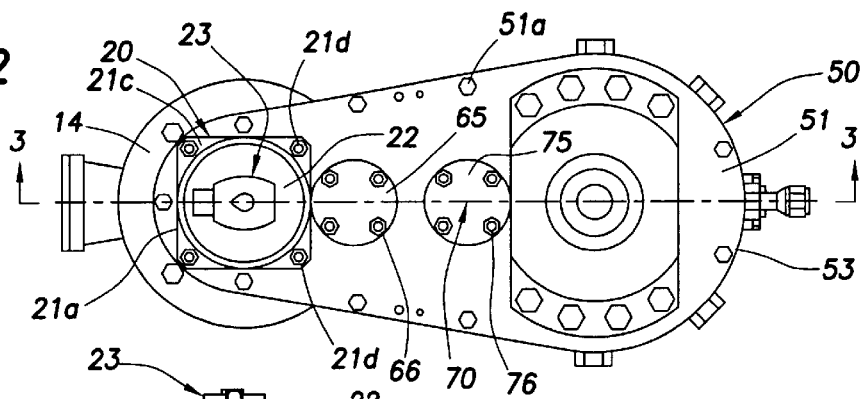
FIG. 2 is a top plan view of a triple reduction valve actuator with three gear sets.
Figure 5:
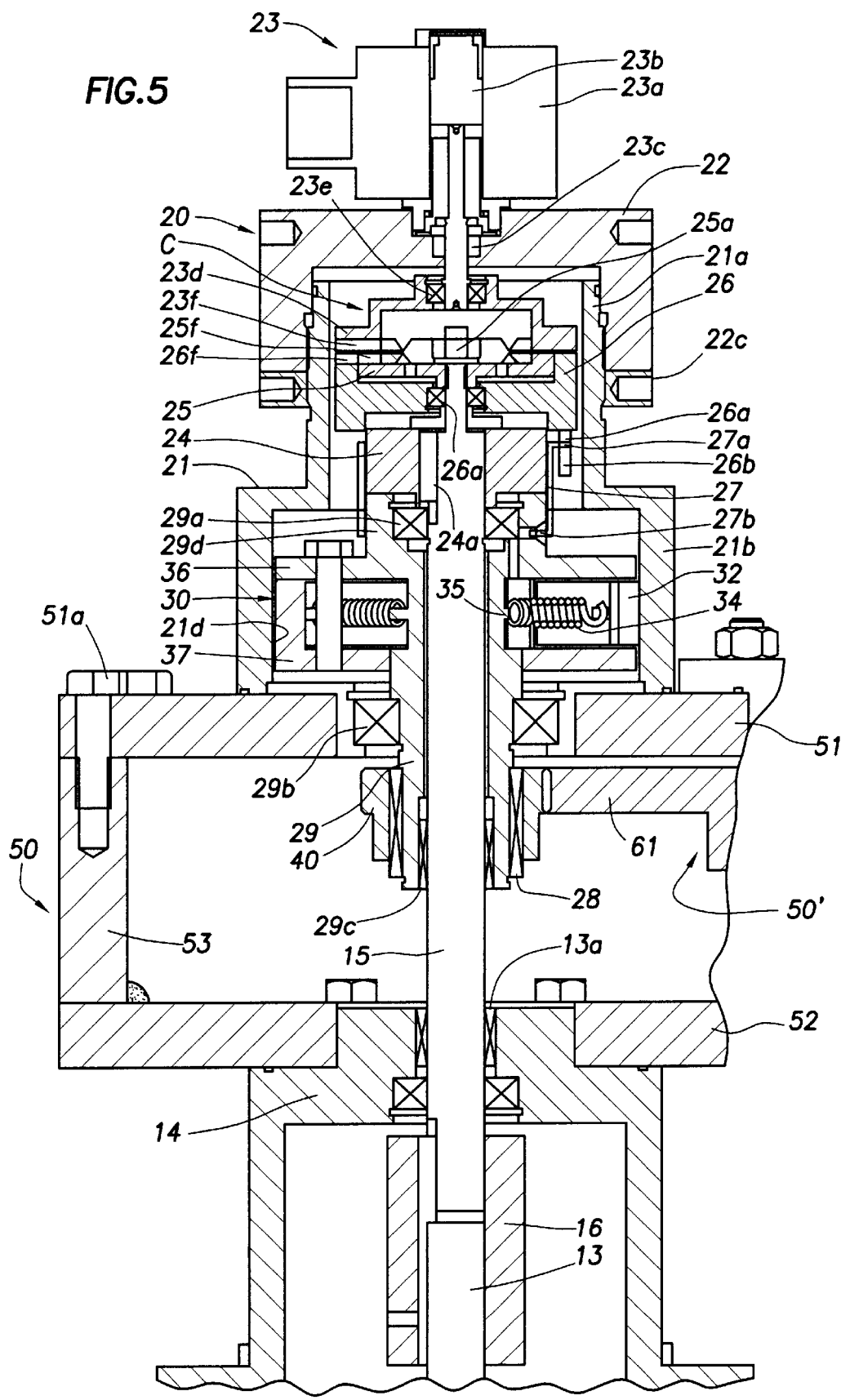
FIG. 5 is an enlarged fragmentary cross-sectional view through the control module.

Referring to FIGS. 2 and 5 of the drawing, the numeral 20 generally designates a control module for transmitting torque from motor input shaft 15 to a gear train 50'.

A control module housing 21 has an upper portion 21a for housing a wrap spring clutch "C", a lower portion 21b which forms a damper housing and a flange 21c secured by cap screws 21d to a gear box 50. The upper portion 21a of housing 21 is externally threaded. An internally threaded solenoid adapter cap 22, having a solenoid 23 mounted thereon, screws on to the upper portion 21a of housing 21.

Solenoid 23 comprises a coil 23a and plunger 23b, plunger 23b being resiliently urged toward the retracted position illustrated in FIG. 5 of the drawing, by a compression spring 23c. Cap 22 has an internally threaded central opening in which an externally threaded nipple on solenoid 23 is secured. Plunger 23b has a stem which extends downwardly through the opening in cap 22. A control module disc 23d is rotatably secured to the lower end of the plunger shaft by bearings 23e. The lower face of control module disc 23d has radially extending gear teeth 23f which have opposed faces inclined at an angle of 45 degrees relative to the lower face of disc 23d. Teeth 23f are circumferentially spaced such that the distance between adjacent teeth 23f is greater than the width of each tooth.

When the coil 23a of solenoid 23 is not energized, compression spring 23c urges plunger 23b to the retracted position illustrated in FIG. 5. When coil 23a is energized, plunger 23b is extended and held in the extended position so long as coil 23a is energized.

Referring to FIG. 5 of the drawing, a input drive hub 24 is secured by a drive key 24a to input shaft 15' and an input shaft disc 25 is secured to the upper end of input shaft 15 by a spline connector or threads and is held in position by a lock nut 25a. Input shaft disc 25 has spaced radially extending gear teeth 25f having opposite faces inclined at 45 degrees relative to the upper face of input shaft disc 25. Teeth 25f are circumferentially spaced apart a distance greater than the width of each tooth.

A control module hub 26 is rotatably mounted on bearings 26a mounted on input shaft 15. Control module hub 26 is an idler and is not driven directly by input shaft 15.

Control module hub 26 has spaced radially extending teeth 26f having surfaces inclined at an angle of 45 degrees relative to the upper surface of hub 26, teeth 26f being spaced apart a distance greater than the width of each tooth. Teeth 25f on input shaft disc 25 and teeth 26f on control module hub 26 can be moved to be aligned. It should be noted that teeth 23f have a length, extending radially of control module disc 23d, to permit engagement of teeth 25f and 26f.

In the preferred embodiment of the invention, control module 20 is set up such that the teeth 23f, on control module disc 23d rotatably supported on the end of solenoid plunger 23, are spaced above teeth 25f and 26f on input shaft disc 25 and control module hub 26. Threaded cap 22 is screwed onto the upper portion 21a of housing 21 to establish a predetermined vertical clearance between teeth 23f on control module disc 23d and teeth 25f and 26f. A lock nut 22c is then tightened for maintaining cap 22 having control disc 23d mounted therein in the prescribed position.

Control module hub 26 has two closely spaced pins 26a and 26b positioned adjacent opposite sides of a tang 27a on the upper end of drive spring 27. Pins 26a and 26b move tang 27a in either a clockwise or a counter-clockwise direction depending on the direction of rotation of the hub 26.

A hollow clutch shaft 29 is rotatably mounted on input shaft 15, the upper end being supported by bearings 29a and the lower end in bearings 29b. A clutch output hub 29d is formed on the upper end of the hollow clutch shaft 29.

From the foregoing it should be readily apparent that input shaft disc 25 and input drive hub 24 rotate with input shaft 15. Control hub 26 is an idler and has a recess formed therein in which input shaft disc 25 rotates. Teeth 25f on input shaft disc 25 and teeth 26f on control module hub 26 are preferably substantially equally spaced circumferentially and have upper surfaces which lie in a common plane.

When the solenoid 23a of solenoid 23 is energized, plunger 23b moves control module disc 23d downwardly such that teeth 23f are positioned between teeth 25f and 26f on input shaft disc 25 and control hub 26. Teeth 25f on input shaft disc 25, driven by input shaft 15 will move into engagement with front faces on teeth 23f on control module disc 23d. Rear faces of teeth 23f on control module disc 23e will be moved by teeth 25f on input shaft disc 25 into engagement with rear faces of teeth 26f on idler hub 26. Rotation of control module hub 26, relative to input drive hub 24 exerts force through pins 26a and 26b for moving tang 27a on one end of drive spring 27 relative to tang 27b on the other end. Tang 27b is anchored in clutch drive shaft hub 29d, as best illustrated in FIG. 5. Rotation of control module hub 26 will wrap spring 27 about input drive hub 24 and output hub 29d on clutch shaft 29 for positively driving clutch shaft 29 at the same speed of rotation as input shaft 15.

The electrically actuated wrap spring clutch "C" comprises an input hub 24, an output hub 29d, and a spring 27 whose inside diameter is slightly larger than the outside diameter of the two hubs and wherein a solenoid 23 is energized to move a plunger 23b to rotate one end 27a of the spring 27 relative to the other end 27b of the spring to wrap it down tightly on the hubs 24 and 29d, positively engaging them and causing them to rotate in synchronism for transmitting power.

It should be readily apparent that clutch shaft 29 and input shaft 15 will be drivingly connected so long as the coil 23a of solenoid 23 is energized. In the event of power failure, compression spring 23c urges plunger 23b and control module disc 23d to the disengaged position shown in FIG. 5 of the drawing. When the teeth on control module disc 23d move out of engagement with teeth 25f and 26f, control module hub 26 will no longer be driven and will be free to rotate, which allows drive spring 27 to become slack such that input drive hub 24 will stop driving output hub 29d on clutch shaft 29 allowing the clutch shaft to be free to reverse rotation to its fail-safe position.

A centrifugal brake 30 is mounted on clutch shaft 29 inside the lower portion 21b of housing 21. A plurality of brake shoes 32 are mounted on springs 34. Springs 34 extend radially from a spring holder ring 35 on clutch shaft 29 and have opposite ends secured to shoes 32. Shoes 32 are captured between a back plate 36 and a dampener retainer plate 37. Brake 30 is tuned by selecting shoes 32 and springs 34 for maintaining shoes 32 in a retracted position spaced from the inner wall 21d of the lower portion 21b of damper housing 21 until they are rotated at a predetermined speed wherein centrifugal force moves the shoes into engagement with wall 21d of housing 21.

As will be hereinafter more fully explained, centrifugal brake 30 is not engaged when shaft 15 is driven by motor 12 and the wrap spring clutch "C" is energized. However, when the wrap spring clutch "C" is released, the actuator compression spring 95 in the valve actuator 90 will exert torque through the gear train 50', the input pinion 40 and the one-way roller clutch 28 for rotating clutch shaft 29 at a speed in excess of that at which the brake 30 is pre-set, which will result in shoes 32 moving into engagement with the wall 21d of damper housing 21 which will limit the speed of rotation of clutch shaft 29.

As illustrated in FIG. 5, input shaft 15 extends through a roller clutch 13a in a wall of motor mount 14 and is mounted in a roller bearing 29c in the lower end of hollow clutch shaft 29 having an input pinion 40 mounted thereon. A roller clutch 28 is press fitted into input pinion 40 and is configured to transmit torque between the clutch shaft 29 and input pinion 40 in one direction and allow free overrun in the opposite direction, while concentrically supporting the input pinion 40 on input shaft 31. Roller clutch 13a is press fitted into the motor mount 14 to allow rotation of the input shaft 15 in a clockwise direction, as viewed in FIG. 2. Each of the roller clutches 13a and 28 has precisely formed interior ramps that provide surfaces against which the rollers wedge to positively transmit torque. Transition from overrun to lock normally occurs with minimal lost motion or backlash. This type of roller clutch is sometimes referred to as a sprag or one way clutch.

Figure 3:
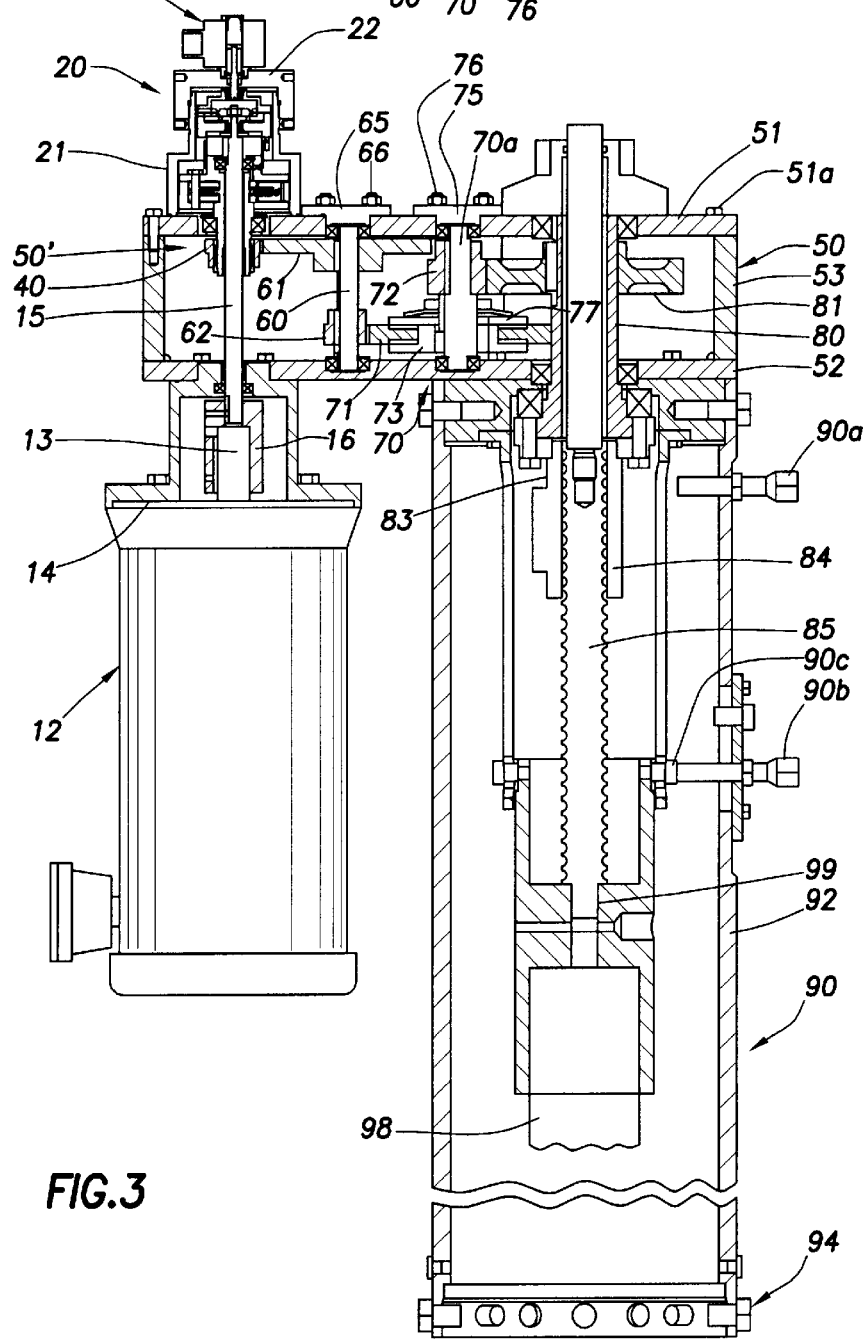
FIG. 3 is a cross-sectional view taken along line 3—3 of FIG. 2.
Figure 4:
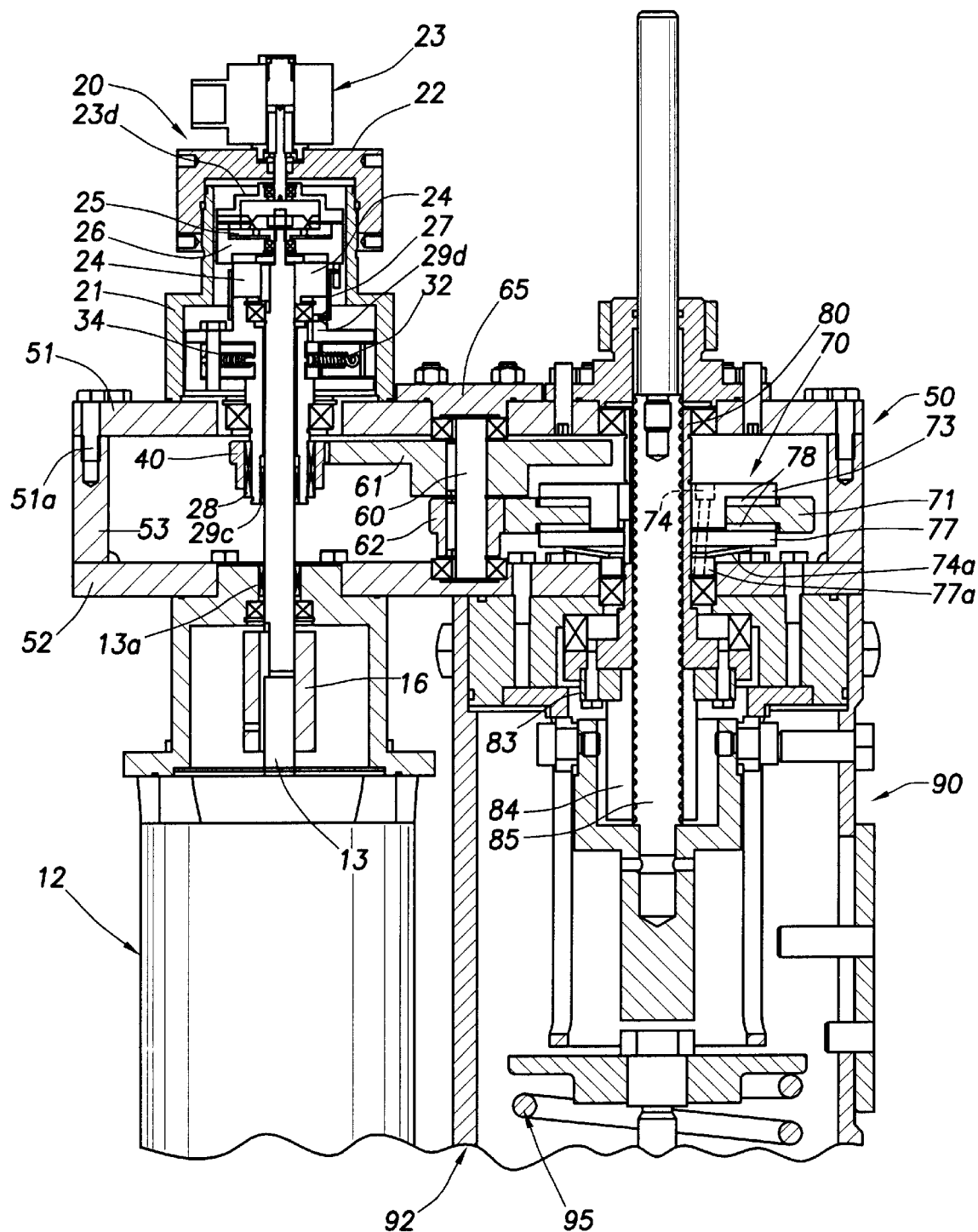
FIG. 4 is a cross-sectional view, similar to FIG. 3, through a double reduction valve actuator with two gear sets.

Referring to FIG. 3 of the drawing, gear case assembly 50 houses a gear train 50' configured to provide a speed reduction from an input shaft 15 to an output shaft 80 while providing increased torque at the output shaft 80. The embodiment of the invention illustrated in FIGS. 2 and 3 of the drawing is a triple reduction device with three gear sets. The embodiment of the invention illustrated in FIG. 4 of the drawing is a double reduction device with two gear sets. A primary difference between the embodiment of FIG. 3 and the embodiment of FIG. 4 is the repositioning of the torque limiting device 70.

Gear case assembly 50 generally includes a housing formed by spaced plates 51 and 52 secured to opposite ends of a curve side wall 53. In the embodiment illustrated in FIG. 3 of the drawing, plate 52 is welded to one end of wall 53 while plate 51 is detachably secured to wall 53 by cap screws.

Motor 12, secured to plate 52 of gear case assembly 50 by motor mount 14, has a motor drive shaft 13 connected through a coupling 16 to an input shaft 15 of a gear assembly including gear train 50'.

Input pinion 40 on clutch shaft 29 is in meshing relation with a first reduction gear 61 on a first reduction shaft 60 having opposite ends mounted in bearings between spaced plates 51 and 52 of the gear case housing. A bearing retainer 65 is removably secured by cap screws 66 to plate 51 for providing access to first reducer shaft 60 and the bearings in which it is mounted. Gear 61 is secured by a key to shaft 60 and a pinion 62 is secured by a key to shaft 60.

Referring to FIGS. 3 and 4, a torque limiter gear 71 is mounted on torque limiter shaft 70a (FIG. 3) or output sleeve 80 (FIG. 4) through a friction overload slip clutch 70 or other torque limiting device. The torque limiting device 70 protects the gear train 50', the ball nut 84 and ball screw 85 from damage due to excessive torque generated by overloads or jamming.

In the illustrated embodiment of FIG. 3, a torque limiter hub 73 is secured by a key to shaft 70a having opposite ends rotatably secured in anti-friction bearings between spaced plates 51 and 52 of gear case assembly 50. A bearing retainer 75 is removably secured to plate 51 by cap screws 76 to provide access to shaft 70a and the bearings in which it is rotatably mounted. Gear 71 is captured between torque limiter hub 73 and a torque limiter pressure plate 77 which is urged toward gear 71 by a Belleville washer 74a and a pressure adjustment nut 77a. A set of friction discs 78 are provided between opposite faces of gear 71 and hub 73 and pressure plate 77.

As best illustrated in FIG. 4 of the drawing, adjusting nut 77a has a plurality of threaded holes formed therein and hub 73 and the pressure plate 77 have apertures through which socket head cap screws 74 extend. Cap screws 74 are rotated for urging the adjusting nut 77a and the Bellville washer 74a to resiliently urge the pressure plate 77 toward hub 73 for adjusting the pressure and consequently the maximum torque which can be carried by torque limiter gear 71.

Nut 77a is adjusted to urge Bellville washer 74a and pressure plate 77 for positively driving gear 71 until the torque exceeds a predetermined limit at which time gear 71 will slip relative to hub 73 for limiting torque transmitted through the gear train 50'.

Torque limiter shaft 70a, illustrated in FIG. 3, has a pinion gear 72 mounted on the end thereof by a key for causing the third reduction pinion 72 to rotate with shaft 70a.

Pinion 72 is in meshing relation with third reduction gear 81 keyed to final output shaft sleeve 80 having opposite ends mounted in anti-friction bearings between spaced plates 51 and 52 of gear case assembly 50. Shaft sleeve 80 is hollow and has a central passage through which a ball screw 85 driven by a ball nut 84 extends. Ball nut 84 has a flange 83 secured by cap screws to the end of shaft 80 such that rotation of shaft 80 imparts rotation to ball nut 84 for moving ball screw 85 longitudinally through output shaft sleeve 80. A ball screw is a screw with a nut on the thread. The nut has a bigger thread than the screw and is filled with small steel balls between the screw and nut to significantly reduce friction losses. A ball screw and nut actuator for a gate valve is disclosed in U.S. Pat. No. 5,195,721, the disclosure of which is incorporated herein by reference.

If the ball screw mechanism 84, 85 is rated to transmit a force of, for example, 100,000 pounds, the torque limiting device 70 would be set to transmit a torque such that the maximum rated force would not be exceeded. For example, torque limiting device 70 might be set to slip if the torque transmitted to the pinion 62 exceeds about 75,000 pounds.

When the valve element in valve V is moved to an actuated position, the amperage in the circuit driving motor 12 will increase resulting in motor 12 being de-energized or turned off. However, solenoid 23 remains energized and maintains the wrap spring clutch "C" in an energized condition. One-way roller clutches 13a and 28 prevent the rotation of input shaft 15 in reverse as a result of force applied by the actuator compression spring 95 in the valve actuator 90. Thus, control module 20 holds valve V in the predetermined position until solenoid 23 is de-energized.

Referring to FIG. 3 of the drawing, actuator 90 is provided with a pair of proximity switches 90a and 90b actuated by a magnetic transducer 90c for indicating the position of the stem through a conductor 90d; illustrated in FIG. 1 of the drawing.

In the event of a power failure, solenoid 23 will be de-energized and solenoid compression spring 23c exerts a force to retract plunger 23b and disengage the wrap spring clutch "C". When clutch shaft 29 is disengaged from input shaft 15, force applied by the actuator spring 95 in the valve actuator 90 will cause clutch shaft 29 to rotate while the speed of rotation is limited by centrifugal brake 30.

The actuator is fail-safe with or without pressure on the valve body. The actuator can be adapted to either fail-close (reverse acting) or fail-open (direct acting) gate valve applications. In the event of a power outage, the actuator solenoid 23 disengages the latch through disc 23d, allowing the actuator coil spring 95 to either close (in fail-close applications) or open (in fail-open applications) the valve. When excessive current is detected, a control panel automatically shuts off the motor 12.

The actuator provides a clean power source, while eliminating the possibility of spilling or leaking control fluid or gas. The actuator does not require venting and unlike may systems, the actuator is not fluid temperature/composition dependent.

Since the actuator uses electric power, the need for a complex pneumatic or hydraulic operating system is eliminated. Response times in pneumatic and hydraulic systems are dependent on temperature and fluid or gas displacement. The actuator disclosed herein is faster, easier to control and more reliable than these systems, because it responds and operates instantaneously.

Rolling element bearings support all gear shafts 60, 70a and 80 at both ends and the unique mechanical centrifugal dampener 30 and torque limiter 70 protect the motor 12 and gear train 50' and provide for a long service life. The control module 30 is mounted directly on the input shaft 15 that is driven by motor 12 at a location of high speed and low torque. The positioning of the wrap spring clutch "C" adjacent the input end of the drive train 50' allows the use of a wrap spring 27 that is more flexible and easier to control than if it were positioned at the outlet end of gear train 50'. The torque generated by a wrap spring clutch "C" arises from the cross sectional strength of the drive spring 27 and is independent of speed. The greater the force of rotation, the more tightly the spring grips the hubs 24 and 29d. Since the solenoid actuated wrap spring clutch "C" is operating at a point of low torque in the drive train, the power consumption to permit operation of the control module on low direct current (DC) power supplied from an emergency battery backup improves the dependability and reliability of the apparatus.

The torque limiting device 70 is positioned to operate at a high torque location in the gear train 50'. Operating at high torque causes the slip clutch to be less sensitive than torque limiting devices positioned between the electric motor 12 and the input shaft 15 of the gear train.

While the embodiment hereinbefore described incorporates three gear sets in the drive train, it should be readily apparent that any number of gear sets may be employed to provide an appropriate speed reduction and torque for a specified application. In a design incorporating two gear sets, it is contemplated that torque limiter hub 73 would be mounted on output shaft 80 at the output end of the gear train, if it is deemed expedient to do so.

Terms such as "left," "right," "horizontal," "vertical," "up" and "down," when used in reference to the drawings, generally refer to the orientation of the parts in the illustrated embodiment and not necessarily during use. These terms used herein are meant only to refer to relative positions and/or orientations, for convenience, and are not to be understood to be in any manner otherwise limiting.

Although the actuator is shown to be a ball nut and helically grooved screw it is contemplated that other low friction, reversible drives may be used including those, for example, having other helically grooved nuts which receive helically grooved screws but in which elements other than balls are in rolling engagement with the grooves. Also, of course, the screw may be supported for rotation in the body and the nut connected to the gate stem.

What is claimed is:

1. A fail safe valve actuator comprising:
   a housing for mounting on a valve body;
   a valve stem having one portion adapted to be connected to a valve member of the valve and another portion having an elongated helical groove in its outer surface;
   means mounting the valve stem in the housing to reciprocate and thereby move the valve member between valve open and valve closed positions;
   compressible means for urging the valve stem toward one position;
   means for moving the valve stem to its other position including a ball nut in the housing in engagement with the helical groove on the valve stem and mounted in the housing for rotation relative to the valve stem;
   an electric motor having an output shaft;
   means for transmitting the torque from the electric motor to the ball nut to rotate the nut and move the valve stem and valve member to one position including a torque limiting device that will disconnect the electric motor from the ball nut when the torque reaches a pre-selected amount; and
   electrically powered means for holding the stem and valve member in one position and then releasing the valve stem and valve member for movement by the compressible means to the other position when the electrical power fails, said electrically powered means for holding the stem and valve member in one position including a wrap spring clutch connected to the output shaft of the electric motor that will engage and transmit torque when a solenoid is energized, said wrap spring clutch having a clutch shaft and a centrifugal brake connected to the clutch shaft that will engage and limit the speed of rotation of the clutch shaft when the speed of rotation of the clutch shaft reaches a pre-selected speed of rotation.

2. A fail safe valve actuator according to claim 1, said electrically powered means further comprising:
   a housing having an upper portion and a lower portion, said wrap spring clutch, connected to the output shaft of the electric motor, being mounted in said upper portion of said housing and said clutch shaft extending through said lower portion of said housing, said centrifugal brake being mounted in said lower portion of said housing to limit the speed of rotation of the clutch shaft when said wrap spring clutch is not engaged.

3. A fail safe valve actuator according to claim 2, said wrap spring clutch comprising:

an input shaft having an axis;

a control module disc rotatably mounted for movement by the solenoid in a direction parallel to said axis, said control module disc having downwardly projecting teeth;

an input drive hub and an input shaft disc drivingly connected to said input shaft, said input shaft disc having upwardly projecting teeth;

a control hub rotatably connected to said input shaft, said control hub having a recess formed therein in which said input shaft disc rotates and having upwardly projecting teeth;

said teeth on said input shaft disc and said teeth on said control module hub projecting toward said teeth on said control module disc and having upper surfaces which lie in a common plane.

4. A fail safe valve actuator according to claim 3, wherein said control module disc has a lower face and radially extending gear teeth which have opposed faces inclined at an angle of 45 degrees relative to the lower face of the disc.

5. A fail safe valve actuator according to claim 4, wherein said control hub and said input shaft disc have upper faces and radially extending gear teeth which have opposed faces inclined at an angle of 45 degrees relative to the upper faces.

6. A fail safe valve actuator according to claim 5, wherein said teeth on said input shaft disc when driven by input shaft will move into engagement with first faces said on teeth on control module disc and second faces on teeth on said control module disc will be moved by teeth on said input shaft disc into engagement with faces on teeth on said control hub.

7. A fail safe valve actuator according to claim 6, wherein said teeth are circumferentially spaced such that the distance between adjacent teeth is greater than the width of each tooth.

8. A fail safe valve actuator according to claim 6, wherein said clutch shaft has an output hub and wherein said wrap spring clutch includes a drive spring has a first tang on one end and a second tang on the other end, said first tang being secured to said control hub and said second tang being secured to said output hub on said clutch shaft.

* * * * *